United States Patent [19]

Jeffers et al.

[11] 4,406,047

[45] Sep. 27, 1983

[54] INSTRUMENT AND PROCEDURE FOR REPLACING NUCLEAR REACTOR JET PUMP HOLDDOWN BEAMS

[75] Inventors: Donald M. Jeffers, Plainfield; Vincent Kokal, New Lenox, both of Ill.

[73] Assignee: Commonwealth Edison Co., Chicago, Ill.

[21] Appl. No.: 224,949

[22] Filed: Jan. 14, 1981

[51] Int. Cl.³ ........................ B23P 19/00; B65D 51/00

[52] U.S. Cl. ........................................ 29/426.5; 294/73

[58] Field of Search ................. 269/46, 246, 247, 250, 269/287; 294/67 DC, 73, 103 R; 403/315, 316; 248/74 R, 226.1, 316 A; 29/426.5

[56] References Cited

U.S. PATENT DOCUMENTS

| | | | |
|---|---|---|---|
| 1,390,212 | 9/1921 | Murray | 294/73 |
| 2,187,642 | 1/1940 | Brown | 269/246 |
| 2,676,629 | 4/1954 | Solum | 269/287 |

*Primary Examiner*—Francis S. Husar
*Assistant Examiner*—Steven E. Nichols
*Attorney, Agent, or Firm*—Hume, Clement, Brinks, Willian & Olds, Ltd.

[57] ABSTRACT

A method and tool (40) for replacing jet pump hold-down beams (17) in a nuclear reactor is disclosed. The tool (40) has an inner frame (41) and an outer frame (28). Each frame defines two spaced plates (33 and 30, respectively). Each inner and outer plate has a jaw (34, and 31, respectively), defined therein. The frames (41, 23) are movably nested such that the jaws (34, 31) of adjacent inner (33) and outer (30) plates form two pairs of opposed jaws (31, 34) each sized and positioned to receive and hold one of two protruding members (20) of the holddown beam (17) such that the beam (17) is suspended between the pairs of opposed jaws (31, 34). In removing a beam (17), the beam (17) is first unlocked, then its protruding members (20) are captured by the tool's (40) pairs of opposed jaws (31, 34), and finally the beam (17) is disengaged from its keeper (26). In installing a beam (17), this procedure is substantially reversed, care being taken to position the beam (17) properly for engagement of the keeper (26).

10 Claims, 6 Drawing Figures

FIG. 2
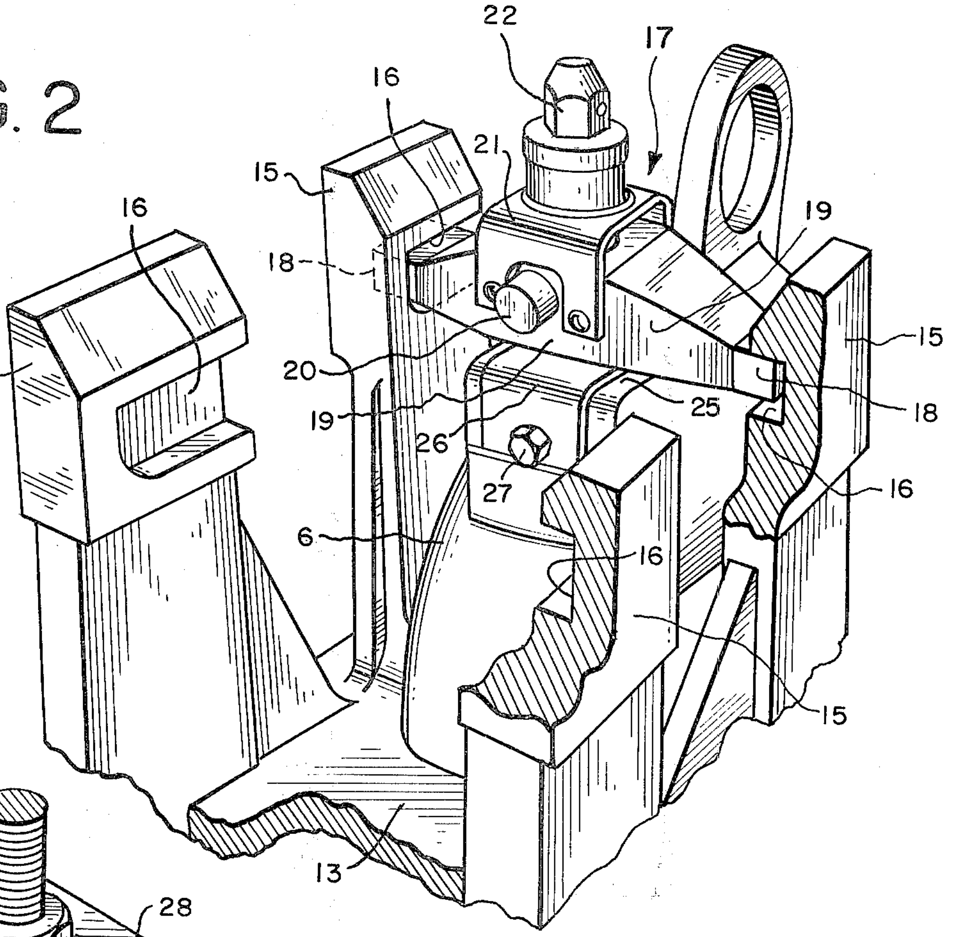
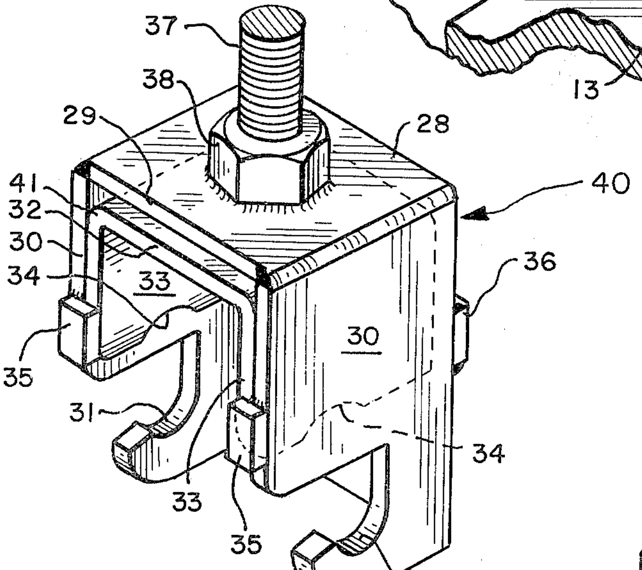
FIG. 4
FIG. 3
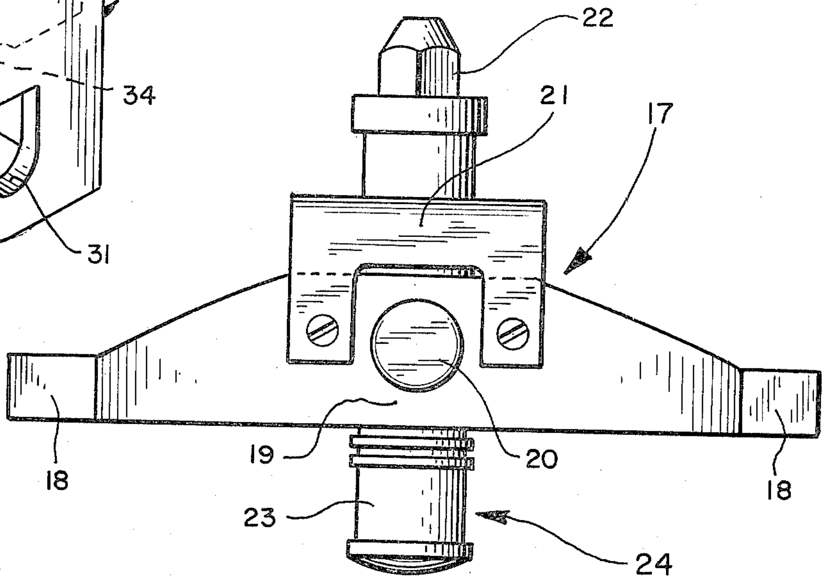

INSTRUMENT AND PROCEDURE FOR REPLACING NUCLEAR REACTOR JET PUMP HOLDDOWN BEAMS

BACKGROUND OF THE INVENTION

This invention relates to a tool for replacing nuclear reactor jet pump holddown beams.

Many nuclear power generating plants, such as the two General Electric 800 megawatt units operated by the Commonwealth Edison Company at the Dresden station in Morris, Ill., utilize boiling water reactors manufactured by the Babcock and Wilcox Co.

Each of these reactors includes a vessel which is an upright cylinder approaching 70 feet in height, with both of its ends capped. The reactor vessel is filled with water. Towards the bottom of the reactor vessel lies the reactor core. The core is separated from the reactor vessel by a core shroud, which is essentially another cylindrical wall, positioned inside and coaxially with the reactor vessel. Jet water pumps are mounted in the cylindrical space between the reactor vessel and the core shroud, spaced around the shroud. The jet pumps act to direct water into the lower regions of the reactor to ensure adequate circulation. The reactor vessel cut-away view of FIG. 1 shows a jet pump assembly which includes two such jet pumps 3 mounted in the space between the reactor vessel 1 and the core shroud 2.

Each jet pump assembly includes as inlet riser 4 which is the water intake pipe of the jet pumps 3. At its upper end the inlet riser 4 connects to a head 5. The head 5 in turn is connected to two throats 7 of the jet pumps 3 via two "J"-shaped nozzles 6. Each of the two throats 7 is a vertical pipe which is connected to the narrow end of a substantially conically shaped diffuser pipe 8. Through the nozzle 6, throat 7, and diffuser 8 the water is pumped downward to the lower periphery of the reactor core (not shown).

One throat 7 lies on each side of the inlet riser 4 along the shroud 2. The inlet riser 4 is secured to the reactor vessel wall 1 by means of a brace 11. The throats 7 are secured to the inlet riser 4 by means of a gate assembly 9. The gate assembly 9 is essentially a set of two restrainer gates 10, 10 rigidly attached to the inlet riser 4 with each of the restrainer gates 10 clamped around a respective one of the throats 7.

The head 5 of the jet pump assembly has a face 13 that covers and closes the top of the inlet riser 4. The face 13 has two mouths 14 formed therein, each of which opens into the inlet riser 4. Each mouth 14 is in pressure contact with the shorter leg of one "J"-shaped nozzle 6. Each mouth 14 has two ears 15 positioned alongside it, one ear on each side of the mouth. This structure can be seen in greater detail in FIG. 2 which shows a top perspective view of the head 5. The ears 15 are vertical studs rigidly connected to the face 13, each ear 15 having a channel 16 substantially parallel to the face 13 and facing the channel in the other ear associated with that mouth, the channels 16 lying toward the top of the ears 15.

The "J"-shaped nozzle 6 of each jet pump 3 is held in contact with its respective mouth 14 by a holddown beam 17 which extends between the two ears associated with that mouth and engages the channels 16 of the ears with its end portions 18.

FIG. 3 shows a side view of one of the holddown beams 17. The body of the beam 17 is a bar 19 which tapers towards its ends and terminates in end portions 18. Protruding from the bar 19 along its length are two torquing pins 20, one on each side of the bar 19. The pins 20 are used for positioning the beam 17 and rotating it into position to engage the end portions 18 in the channels 16 of the ears 15. Mounted over the top of the bar 19 is bracket 21 through which passes a beam bolt 22. The beam bolt 22 is threaded through the bar 19 and on the underside of the bar 19 it terminates in pressure pin 23 which forms a keeper channel 24 along its periphery.

Referring back to FIG. 2, the beam 17 crosses the "J"-shaped nozzle 6 along its convex curve at a flat landing 25. The landing 25 defines a depression 25' (in FIG. 6) sized to receive the beam's pressure pin 23. Partially surrounding the depression along its edge is a "C"-shaped keeper 26 which is attached to the nozzle 6 by bolt 27. The function of the keeper 26 is to engage the keeper channel 24 of the pressure pin 23 and thus to hold the pin 23 in the depression 25' when the beam 17 is not locked into place.

When the beam 17 is positioned as shown in FIG. 2, tightening of the beam bolt 22 forces pressure pin 23 down into the depression 25' to press against the nozzle 6, thus keeping the nozzle 6 in pressure contact with the mouth 14.

Because the holddown beams 17 are held in place by the keepers 26, whenever the need has arisen in the past to remove and replace the holddown beams, it has been necessary to open the restrainer gates 10 of the gate assembly 9, to disengage the beam 17 from the ears 15, and to lift out the throat 7 and the "J"-shaped nozzle 6 along with the beam 17 as a unit. Only in this way could access be gained to the keeper 26 and the beam 17 so that the keeper 26 could be removed, the beam 17 replaced, and the keeper 26 repositioned. Then the throat and nozzle unit again had to be repositioned inside the restrainer gates 10 and on top of the inlet riser head 5 and diffusers 8, the restrainer gates 10 had to be reclosed, and the beam 17 locked into engagement of the ears 15.

This operation is both difficult and time consuming, because there is limited space to work in between the core shroud 2 and the reactor vessel wall 1 where the jet pumps 3 are located. Moreover, the restrainer gates 10 are bolted closed around the throats 7 and then the bolts are tackwelded to prevent the restrainer gates 10 from coming loose, and therefore opening of the restrainer gates 10 is difficult. In addition, surface conditions of restrainer gates 10 which have been in use for a period of time may interfere with tack welding the gate assembly 9 closed, and may necessitate replacement of the gates 10—a difficult and expensive operation. Furthermore, the jet pumps 3 are submerged and therefore all work must be done below 40 feet of water.

Due to the difficulties presented by this servicing procedure, the time required to replace the beam on a single jet pump has in the past been three days, and there are 20 of the jet pumps in the GE-designed 800 MW reactor. Of course, during servicing the reactor cannot be operated, and it is estimated that each day of reactor down-time results in a loss of one quarter million dollars. Thus any improvement in the amount of time required to change a jet pump beam results in significant savings.

SUMMARY OF THE INVENTION

The present invention is directed to an improved method and tool for replacing jet pump holddown beams in a markedly reduced time period. According to this invention, a tool is used to remove and install jet pump holddown beams without the necessity of disturbing any other part of the jet pump.

The jet pump holddown beam tool of this invention includes a support structure which defines an inner space. Surfaces of the support structure define intrusions sized and positioned to receive and hold or release a respective one of the two torquing pins of a holddown beam, such that the beam is positioned substantially in the inner space. One preferred embodiment of the tool of the invention comprises nested inner and outer frames, each of which frames includes two spaced plates. Each plate defines a jaw, with each pair of adjacent inner and outer plates defining a reciprocal pair of opposed jaws sized and positioned to receive and pivotably hold a respective one of the two torquing pins of a holddown beam, such that the beam is positioned between the two pairs of adjacent plates. This preferred embodiment also has a control member which acts to cause the jaws to pivotably capture or release the torquing pins of the beam. In one preferred embodiment of this invention the control member is also utilized to position the tool during use.

To remove a jet pump holddown beam using the tool of this invention, the beam is first unlocked. This generally involves retracting the beam bolt, rotating the beam approximately 90° about the beam bolt, and slightly advancing the beam bolt; this is done with a standard tool known to the art. Then the tool of this invention is positioned around the beam and the torquing pins are engaged by the tool's intrusions, or jaws. The beam is then pivoted substantially about its torquing pins until the pressure pin disengages its keeper. The pivoting may be accomplished by pushing on one end of the beam in a direction substantially transverse to the beam with the tool previously utilized for unlocking the beam. The tool of this invention with the beam securely held therein is then withdrawn.

To install a jet pump holddown beam using the tool of this invention, this procedure is essentially reversed: the beam, held in the tool, is positioned such that the pressure pin abuts the open side of the keeper, the beam is pivoted substantially about its torquing pins until the pressure pin engages the keeper, the beam tool is disengaged from the beam, and the beam is then locked into position.

One advantage of the present invention, already mentioned above, is that it allows the jet pump holddown beam to be installed and removed without disturbing any other part of the jet pump.

Another advantage of the invention is that it sharply reduces the time required for replacing a beam to less than one day, thereby saving two days of maintenance time per each jet pump and significantly reducing the down time of the reactor. Thus, the tool and method of this invention substantially reduce the direct cost in time, equipment, and money associated with replacement of a holddown beam, and greatly reduce the time during which maintenance personnel are exposed to the internal environment of the reactor.

Other advantages of the invention, together with the invention itself, will best be understood by reference to the following description taken in connection with the accompanying drawings.

BEIEF DESCRIPTION OF THE DRAWINGS

FIG. 2 is a perspective view of the head of a jet pump, with one holddown beam removed;

FIG. 3 is a front view of a jet pump holddown beam;

FIG. 4 is a perspective view of one preferred embodiment of the tool of this invention;

DETAILED DESCRIPTION OF THE PREFERRED EMBODIMENT

Figure 1:
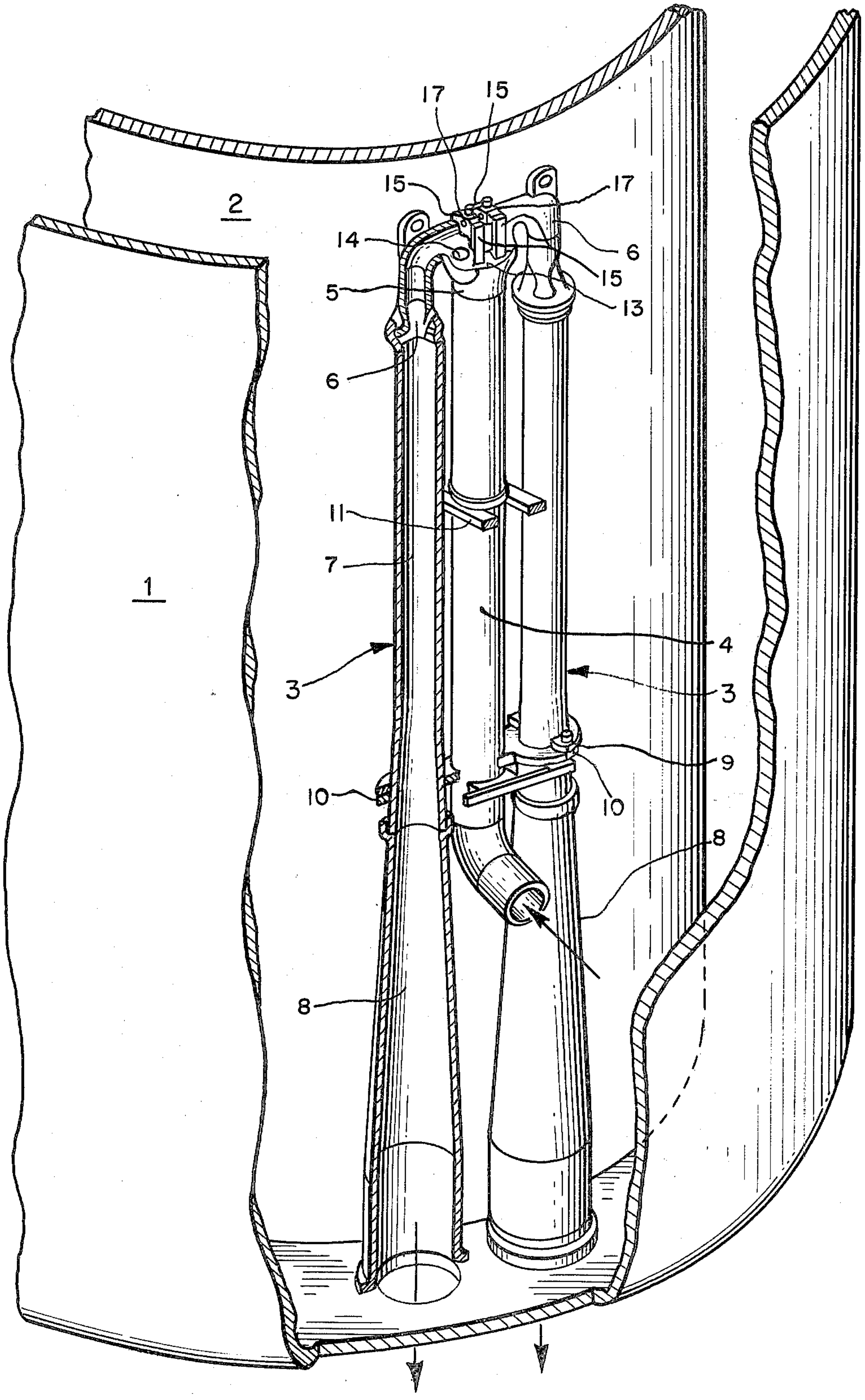
FIG. 1 is a reactor cut-away view showing a jet pump.

Referring now to the drawings, FIG. 4 shows a preferred embodiment 40 of the jet pump holddown beam tool of this invention. The tool 40 has an outer frame 28 comprised of an outer top plate 29 and two outer side plates 30 which are parallel to each other, perpendicular to plate 29, and rigidly suspended by their edges, for example by being welded, from the ends of plate 29. The lower end of each plate 30 defines a hook-like outer jaw 31 which jaw faces to the side of the plate 29.

Slidingly mounted inside the outer frame 28 is an inner frame 41 which is comprised of an inner top plate 32 and two inner side plates 33. The inner frame 41 is shaped like the outer frame 28 but for the jaws. Each inner side plate 33 defines an inner jaw 34 which is opposied to the respective adjacent outer jaw 31. Each inner jaw 34 defines a concave depression formed in the bottom edge of the respective inner side plate 33.

Figure 5:
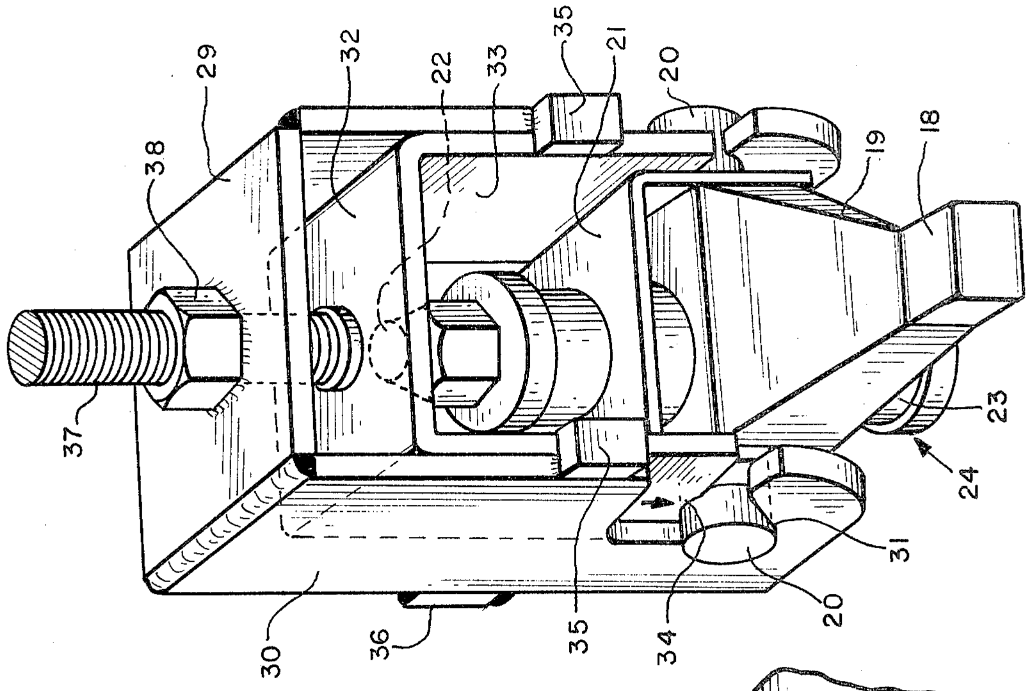
FIG. 5 is a perspective view of the holddown beam of FIG. 3 engaged in the tool of FIG. 4.
Figure 6:
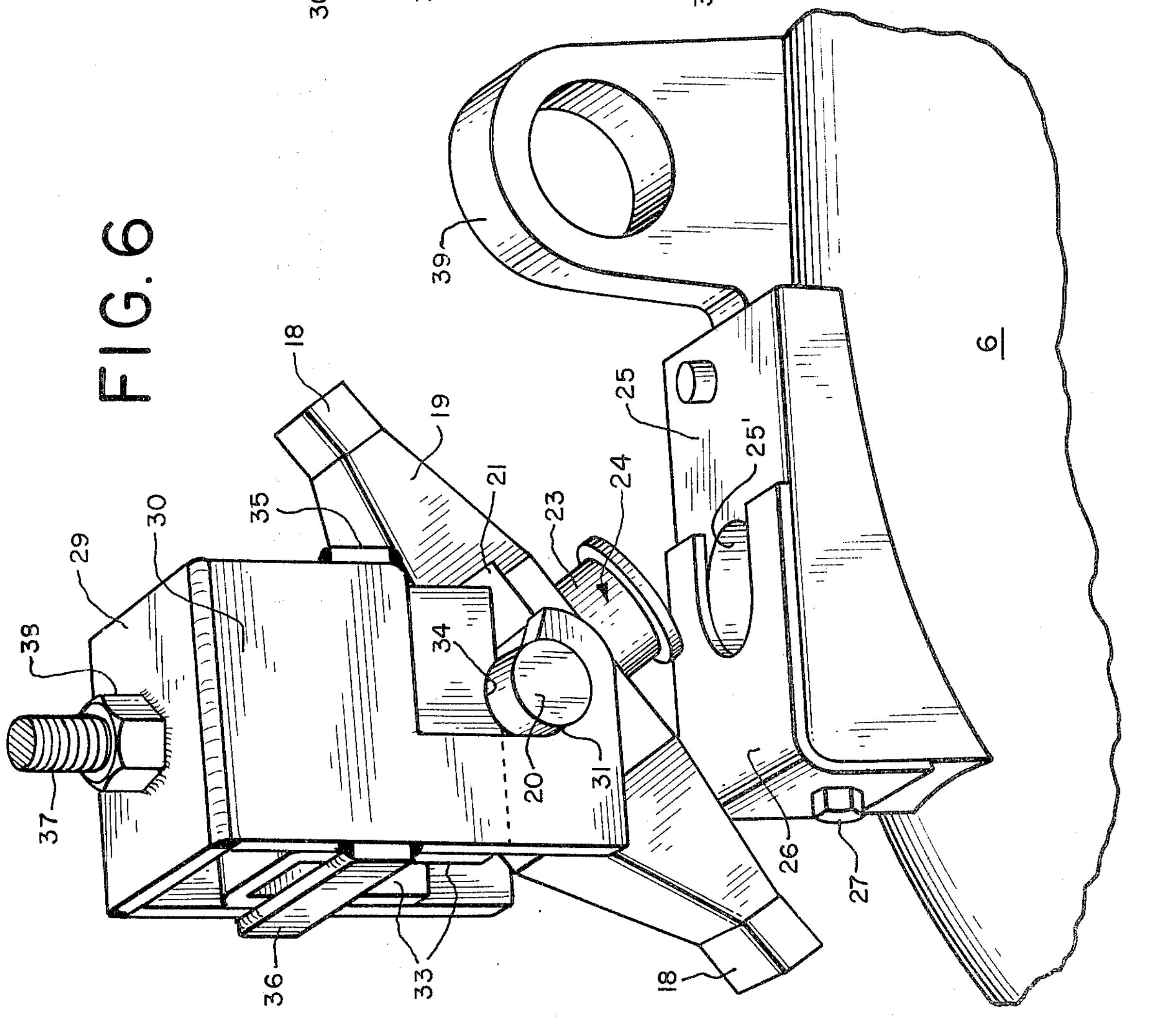
FIG. 6 is a perspective view showing the tool and beam of FIG. 6 positioned relative to a pump nozzle landing in the installing position.

Each outer jaw 31 and its adjacent inner jaw 34 together form a pair of opposed jaws 31, 34 sized to engage a respective torquing pin 20 of the jet pump holddown beam 17, as shown in FIGS. 5 and 6. Thus, the tool 40 provides two pairs of opposed jaws 31, 34, one for each of the beam's two torquing pins 20.

Returning to FIG. 4, each outer side plate 30 has affixed to its side edge on which the jaw 31 opens a guide flange 35. A guide bar 36 is affixed to the opposite edge of both outer side plates 30 to extend therebetween. The guide flanges 35 and guide bar 36 keep and inner frame 41 positioned within the outer frame 28; in addition, the guide bar 36 strengthens the frame construction of the tool 40.

A control mechanism is provided to move the inner frame 41 relative to the outer frame 28 and thus to open and close the two pairs of opposed jaws 31, 34. This control mechanism includes a hole (not shown) through the outer top plate 29 over which hole a threaded nut 38 is fixedly attached to the top surface of outer top plate 29, and a threaded control rod 37 which engages the nut 38, passes through the hole in the outer top plate 29, and is rotatably attached to the inner top plate 32. When the control rod 37 is rotated clockwise, it advances in the nut 38, thereby causing the inner frame 41 to move down relative to the outer frame 28 to close the pairs of opposed jaws 31, 34. Similarly, when the control rod 37 is rotated counterclockwise, it retracts in the nut 38, thereby pulling on the inner top plate 32 and causing the inner frame 41 to move up relative to the outer frame 28, to open the pairs of opposed jaws 31, 34.

Preferably, the tool is made of stainless steel. In this preferred embodiment, the outer side plates 30 are about 8½ inches (about 21.5 cm) tall, 4 inches (about 10 cm) wide and ¼ inch (about 0.6 cm) thick. Each outer jaw 31 is about 1¼ inch (about 3.2 cm) wide at its narrowest point and about 2 inches (about 5 cm) wide at its highest point. Each jaw 31 extends about 2⅝ inches (about 6.7 cm) into the side of its outer side plate 30 and lies about 1 inch (about 2.5 cm) above the plate's bottom edge. The tip of the hook is inset about ¾ inch (about 2 cm) from the forward edge of the plate 30. The outer top plate 29 is about 4¾ inches (about 12 cm) long, 4 inches (about 10 cm) wide, and ⅜ inch (about 1 cm) thick. The inner frame 41 is made of about ¼ inch (about 0.6 cm) sheet steel. The inner side plates 33 are about 6 inches (about 15 cm) tall. The inner jaw 31 is a depression about ½ inch (about 1.3 cm) deep. The guide flanges 35 and guide bar 36 are also made of ¼ inch (about 0.6 cm) sheet steel. They are 1½ inches (about 4 cm) tall. The guide flanges 35 are about ⅝ inch (about 1.6 cm) wide. The flanges 35 and bar 36 attach to the outer side plates 30 about 3½ inches (about 9 cm) from the bottom of the plates 30. Of course, these dimensions are intended as illustrative rather than limiting. The size and configuration of the tool of this invention can be varied as needed to suit individual applications.

In order to remove a jet pump holddown beam 17, using the tool 40, the beam is first unlocked. The unlocking involves loosening (retracting) the beam bolt 22 (see FIG. 2), rotating the beam 17 approximately 90° about the beam bolt 22, and then retightening (advancing) the beam bolt 22. The beam bolt 22 is first loosened in order to relieve the pressure being exerted by the beam 17 on the nozzle 6 through pressure pin 23 so that the beam 17 can be rotated. The beam bolt 22 is then retightened after the 90° rotation so that the pressure pin 23 substantially enters the depression 25' below keeper 26 and raises the beam 17 off the nozzle 6.

After the beam 17 has been unlocked, the tool 40 of FIG. 4, with its pairs of opposed jaws 31, 34 open, is positioned around the beam 17 so that each of the torquing pins 20 of the beam 17 is positioned in a respective one of the pairs of opposed jaws 31, 34. The tool 40 is positioned by means of the control rod 37.

After the tool 40 has been positioned around the beam 17, the control rod 37 is rotated to close the pairs of opposed jaws 31, 34 on the beam's torquing pins 20 and thus to hold the beam 17 in the tool 40, as shown in FIG. 5. The beam 17 is then pivoted substantially about its torquing pins 20 in a direction such that the beam 17 slopes away from the lifting bail 39 of the associated nozzle 6, as shown in FIG. 6, until the pivoting causes the pressure pin 23 to pivot out from under its keeper 26. A second rod (not shown) can be used to press down on the appropriate end of the beam 17 to cause the beam 17 to tilt out of the keeper 26. The beam 17 is now free of the jet pump 3 and can be carried away by the tool 40.

To install a jet pump holddown beam 17, the above steps are merely reversed. During this procedure, care must be taken in positioning the pivoted beam 17 to abut the bottom edge of the pressure pin 23 against the open edge of the "C"-shaped keeper 26, so that the pressure pin 23 pivots under the keeper 26 when the beam 17 is pivoted into a horizontal position.

Using thus the tool of this invention, the holddown beams of nuclear reactor jet pumps can be replaced quickly and safely. The time required for replacing a beam is cut down to a third. The beam is always securely held and therefore cannot be dropped into the reactor. Nor is a multiplicity of tools required, some of which could be overlooked and dropped into the reactor. The tool is simple in its operation and requires little special training to use. The tool and the method of its use have proven themselves in actual use to be effective and trouble-free.

Of course, it should be understood that various changes and modifications to the preferred embodiment will be apparent to those skilled in the art. For example, the jaw control and tool positioning functions can be separated, the design of the jaws may be changed, different means may be utilized for guiding the inner frame in the outer frame, or the tool may be made to pivot along with the beam. Such changes can be made without departing from the spirit and scope of the invention and without diminishing its attendant advantages. It is therefore intended that such changes and modifications be covered by the following claims.

I claim:

1. A tool for replacing jet pump holddown beams in a nuclear reactor, the beam having two opposed protruding members, the tool comprising:

a support structure defining an inner space, the support structure comprising at least two surfaces, each of which defines intrusions sized and positioned to recieve and hold a respective one of the two protruding members of the beam such that the beam is suspended substantially within the inner space; and means for remotely securing the protruding members of the beam against the respective surfaces of the support structure in order selectively to hold and release the protruding members from the support structure.

2. A tool for replacing jet pump holddown beams in a nuclear reactor, the beam having two opposed protruding members, the tool comprising:

an outer frame defining two spaced outer plates, each outer plate having an outer jaw defined therein;

an inner frame movably disposed within the outer frame, the inner frame defining two inner plates, each inner plate having an inner jaw defined therein, each of the inner jaws reciprocal to an outer jaw to form a pair of opposed jaws sized and positioned to receive and hold a respective one of the two protruding members of the beam such that the beam is suspended between the pairs of jaws; and means for remotely positioning the jaws selectively to hold and release the protruding members of the beam from the tool.

3. A tool for replacing jet pump holddown beams in a nuclear reactor, the beam having two opposed protruding members, the tool comprising:

an outer frame defining two spaced outer plates, each outer plate having a hook defined therein, each hook having a lower support surface, each of the hooks sized and positioned to receive and pivotably hold a respective one of the two protruding members of the beam such that the beam is pivotably suspended between the outer plates;

an inner frame movably nested within the outer frame, the inner frame defining two inner plates, each inner plate having a notch therein sized and positioned to receive and pivotably hold a respective one of the protruding members of the beam against the lower support surface of a hook such that the beam is pivotably suspended between the inner plates; and a control member acting between the inner frame and the outer frame to position the tool and to cause the inner and outer frame to assume a first position in which the beam is pivotably held and a second position in which the beam is released.

4. The apparatus of claim 2 or 3 wherein the inner frame is positioned to slide within the outer frame.

5. The apparatus of claim 2 wherein the operating means comprises a control member acting between the inner frame and the outer frame.

6. The apparatus of claim 3 or 5 wherein the inner frame further defines an inner top plate and the outer frame further defines an outer top plate having an opening therethrough, and wherein the control member comprises a threaded nut attached to the outer top plate over the opening and a threaded rod rotatably attached to the inner top plate, which rod is threaded in the nut and passes through the opening.

7. The apparatus of claim 2 wherein the pairs of opposed jaws open in a direction transverse to the plane of the frames.

8. The apparatus of claim 2 or 3 further comprising guides for guiding the inner frame with respect to the outer frame.

9. A method of removing jet pump holddown beams in a nuclear reactor, the beam having two opposed protruding members and a beam bolt transverse thereto, the bolt being engaged by an open-ended keeper, the method comprising the following steps:

retracting the beam bolt to loosen it;

rotating the beam approximately 90° about the beam bolt; advancing the beam bolt to raise the beam;

positioning a tool for replacing jet pump holddown beams in a nuclear reactor to engage the beam, said tool comprising:

an outer frame defining two spaced outer plates, each outer plate having an outer jaw defined therein;

an inner frame movably disposed within the outer frame, the inner frame defining two inner plates, each inner plate having an inner jaw defined therein, each of the inner jaws reciprocal to the outer jaw to form a pair of opposed jaws sized and positioned to receive and hold a respective one of the two protruding members of the beam such that the beam is suspended between the pairs of jaws; and means for remotely positioning the jaws selectively to hold and release the protruding members of the beam from the tool;

adjusting the jaws to engage the two opposed protruding members with the tool;

pivoting the beam substantially about the protruding members such that the beam bolt disengages the keeper; and lifting the beam away from the keeper.

10. A method of installing jet pump holddown beams in a nuclear reactor, the beam having two opposed protruding members and a beam bolt transverse thereto, and the bolt being engageable by an open-ended keeper, the method comprising the following steps:

advancing the beam bolt;

positioning a tool for replacing a jet pump holddown beams in a nuclear reactor to engage the beam, said tool comprising:

an outer frame defining two spaced outer plates, each outer plate having an outer jaw defined therein;

an inner frame movably disposed within the outer frame, the inner frame defining two inner plates, each inner plate having an inner jaw defined therein, each of the inner jaws reciprocal to an outer jaw to form a pair of opposed jaws sized and positioned to receive and hold a respective one of the two protruding members of the beam such that the beam is suspended between the pairs of jaws; and means for remotely positioning the jaws selectively to hold and release the protruding members of the beam from the tool;

adjusting the jaws to engage the two opposed protruding members with the tool;

positioning the beam within the tool such that the beam is pivoted about the protruding members to lie at an angle to the keeper, and an end of the bolt engageable by the keeper abuts the open end of the keeper;

pivoting the beam substantially about the protruding member such that the beam bolt engages the keeper;

adjusting the jaws to release the beam from the tool;

retracting the beam bolt to lower the beam;

rotating the beam bolt approximately 90° about the beam bolt; and advancing the beam bolt to tighten the beam in place.

* * * * *